United States Patent [19]

Billings et al.

[11] Patent Number: 5,209,665

[45] Date of Patent: May 11, 1993

[54] INTERACTIVE AUDIO VISUAL WORK

[75] Inventors: Zeb Billings, Hartland, Wis.; Harold D. Pierce, Woodland Hills, Calif.; Martin R. J. Moore, Sr., Cedarburg, Wis.

[73] Assignee: Sight & Sound Incorporated, New Berlin, Wis.

[21] Appl. No.: 420,264

[22] Filed: Oct. 12, 1989

[51] Int. Cl.$^5$ .............................................. G09B 5/00
[52] U.S. Cl. .................................... 434/169; 434/178; 434/317; 446/143; 446/397; 341/34; 200/5 A
[58] Field of Search ............... 434/169, 178, 230, 317, 434/339; 200/5 R, 5 A; 341/22, 34; 84/615, 618, 653, 656, 678, 684; 446/143, 397

[56] References Cited

U.S. PATENT DOCUMENTS

| | | |
|---|---|---|
| 3,553,851 | 3/1969 | Doring . |
| 3,600,528 | 8/1971 | Leposavic .......................... 341/34 X |
| 3,641,684 | 2/1972 | Paige . |
| 3,702,032 | 11/1972 | Doring . |
| 3,738,021 | 6/1973 | Hino et al. . |
| 3,744,150 | 7/1973 | Folson ................................... 35/8 A |
| 4,002,355 | 1/1977 | Sendor . |
| 4,123,631 | 10/1978 | Lewis .............................. 200/52 R |
| 4,273,538 | 6/1981 | Ross . |
| 4,303,811 | 12/1981 | Parkinson ........................... 200/5 A |
| 4,337,375 | 6/1982 | Freeman . |
| 4,348,191 | 9/1982 | Lipsitz et al. ........................ 434/340 |
| 4,355,984 | 10/1982 | Slavik et al. ........................ 434/335 |
| 4,358,278 | 11/1982 | Goldfarb . |
| 4,403,965 | 9/1983 | Hawkins . |
| 4,411,628 | 10/1983 | Laughon et al. . |
| 4,423,290 | 12/1983 | Yoshida et al. . |
| 4,425,098 | 1/1984 | Doring . |
| 4,466,801 | 8/1984 | Dittakavi et al. . |
| 4,516,260 | 5/1985 | Breedlove et al. . |
| 4,516,777 | 5/1985 | Nikora .............................. 273/148 B |
| 4,547,630 | 10/1985 | Giammarrusco . |
| 4,555,601 | 11/1985 | Taguchi .............................. 200/5 A |
| 4,562,315 | 12/1985 | Aufderheide ........................ 200/5 A |
| 4,564,954 | 1/1986 | Nittaya et al. . |
| 4,636,881 | 1/1987 | Brefka et al. . |
| 4,703,573 | 11/1987 | Montgomery et al. . |
| 4,706,536 | 11/1987 | Sanders ................................ 84/1.01 |
| 4,749,354 | 6/1988 | Kerman . |
| 4,752,230 | 6/1988 | Shimizu .............................. 434/317 |
| 4,765,623 | 8/1988 | Cardillo et al. . |
| 4,778,391 | 10/1988 | Weiner . |
| 4,809,246 | 2/1989 | Ging .................................... 434/317 |
| 4,818,827 | 4/1989 | Iplinski et al. ...................... 200/5 A |
| 4,969,209 | 11/1990 | Schwab .............................. 455/158 |
| 4,990,092 | 2/1991 | Cummings ........................ 434/317 |

FOREIGN PATENT DOCUMENTS

| | | |
|---|---|---|
| 21990 | 11/1984 | Japan . |
| 60-39878 | 11/1985 | Japan . |
| 181979 | 11/1987 | Japan . |
| 13037 | 4/1990 | Japan . |

OTHER PUBLICATIONS

The ESS Sound Magician Users Manual.

*Primary Examiner*—Richard J. Apley
*Assistant Examiner*—Joe H. Cheng
*Attorney, Agent, or Firm*—Amster, Rothstein & Ebenstein

[57] ABSTRACT

An audio-visual book includes a plurality of pages and a text portion on the plurality of pages. The text portion includes, on each of at least two of the pages, both a plurality of lines of text and a plurality of different predetermined graphic depictions related in concept to the subject matter of the text and interposed within the lines of text. A switching mechanism is disposed in predetermined relationship to the text portion and includes a plurality of individually actuable elements, each of the switches being associated with one of the graphic depictions. A digital sound generator, responsive to actuation of one of the switches, is provided for selectively effecting generation of a sound associated with the subject of the depiction associated with the one switch.

27 Claims, 6 Drawing Sheets

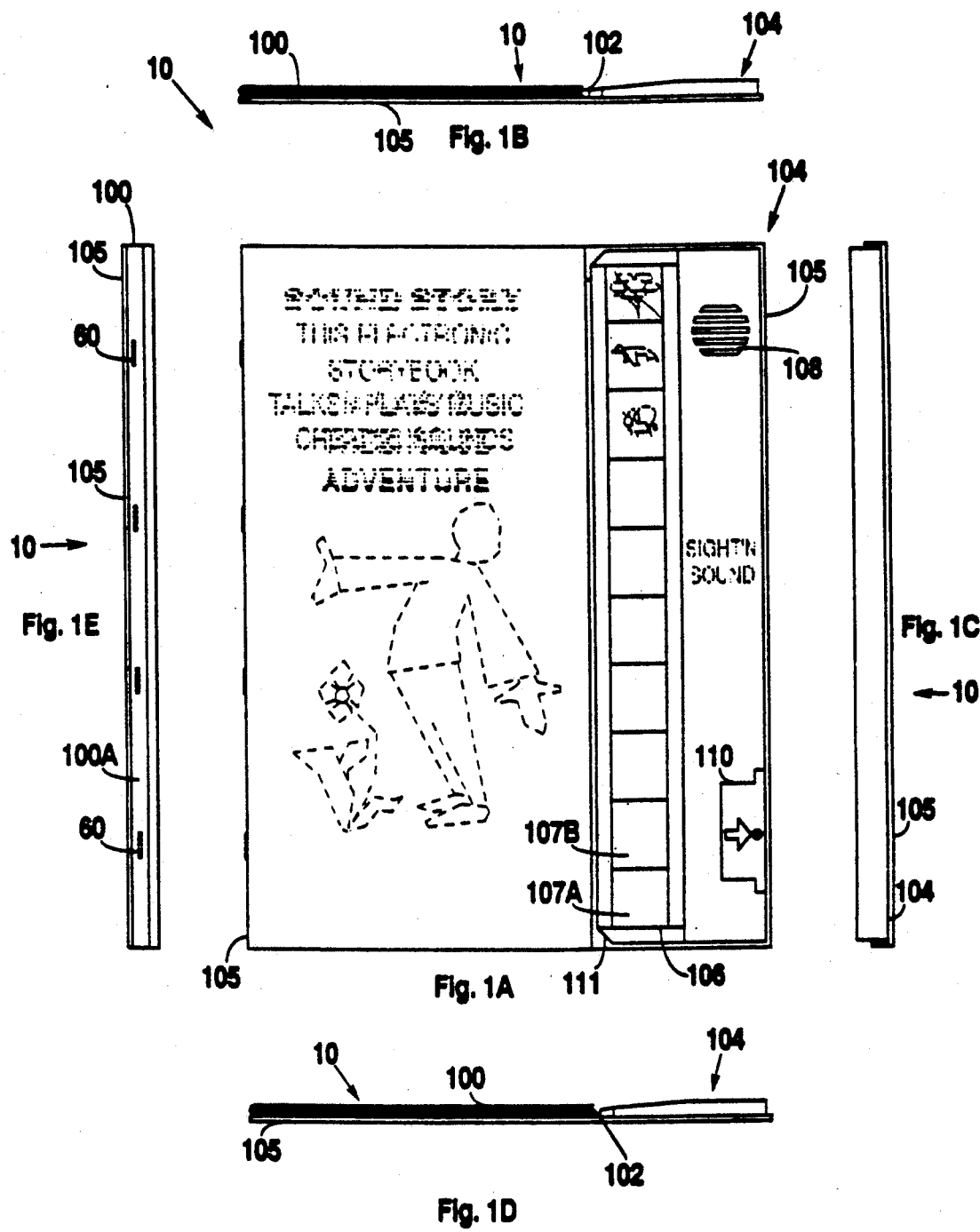

INTERACTIVE AUDIO VISUAL WORK

BACKGROUND OF THE INVENTION

The present invention relates, generally, to electronic amusement devices, and more particularly to electronic amusement devices which reproduce digitized sound.

It is desirable that a child find a toy entertaining and interesting, and that the toy be educating and provide feedback to the child. To this end a number of sound producing amusement devices use audio interaction. In such devices, sounds are prerecorded in analog form on disc or tape, or are recorded in digital form. Such sound producing devices generally provide little visual interaction, and are not particularly conducive to stimulating a child's imagination. Examples of such toys are described in U.S. Pat. No. 4,516,620 issued to Breedlove on May 7, 1985, and in U.S. Pat. No. 4,706,536 issued to Sanders on Nov. 17, 1987.

Electronic audio toys that require spelling, reading, or fine motor skills, are not appropriate for small children. Furthermore, in many electronic audio toys, once the toy begins generating a particular sound, the sound is generated to completion. During the interim, the generation of new or different sounds is inhibited. This can be a source of frustration to small children; to the small child's mind, when a stimulus is provided, e.g., a button is pushed, a sound should be generated, and the toy therefore is not responding to an appropriate stimulus.

Another problem with electronic audio toys is maintaining the power supply. For example, if a toy is thrown in a toy box, and a button inadvertently depressed, when the child returns the batteries may be exhausted. Many existing electronic audio toys generate sound using a sound microchip in conjunction with an inexpensive piezo speaker, and the resulting sound is of relatively low quality. Other problems with electronic audio toys include incorporating speakers into the toy while maintaining a suitable profile and providing a sensing mechanism that is appropriate for small children.

Accordingly, there is a need for an electronic amusement device that provides high quality audio and visual stimulation while encouraging a child to use his or her imagination. Preferably the device would, to some extent, be educational, yet maintain a child's interest and be suitable for a small child to use. Furthermore, there is a need for an energy saving mechanism to prevent rapid discharge of batteries and an interrupt feature to provide for immediate response each time a child selects a sound to be generated.

SUMMARY OF THE PRESENT INVENTION

According to the invention there is provided an interactive audio-visual work comprising a text and graphics portion and an electronic unit predisposed on a substrate. The electronic unit selectively generates one of a plurality of sounds in response to input signals provided by a plurality of selectively actuable switches maintained on the substrate. Circuitry and logic are provided to interrupt the generation of a previously selected sound prior to completion, and initiating the generation of a subsequently selected sound.

BRIEF DESCRIPTION OF THE DRAWING

A preferred exemplary embodiment will hereinafter be described in conjunction with the appended drawing, wherein like elements are denoted with like designations and:

FIGS. 1A is a top plan view of the preferred exemplary embodiment;

FIGS. 1B is a rear elevational view of the preferred exemplary embodiment;

FIG. 1C is a right elevational view of the preferred exemplary embodiment;

FIG. 1D is a front elevational view of the preferred exemplary embodiment;

FIG. 1E is a left elevational view of the preferred exemplary embodiment;

DETAILED DESCRIPTION OF THE PREFERRED EXEMPLARY EMBODIMENTS

Figure 1F:
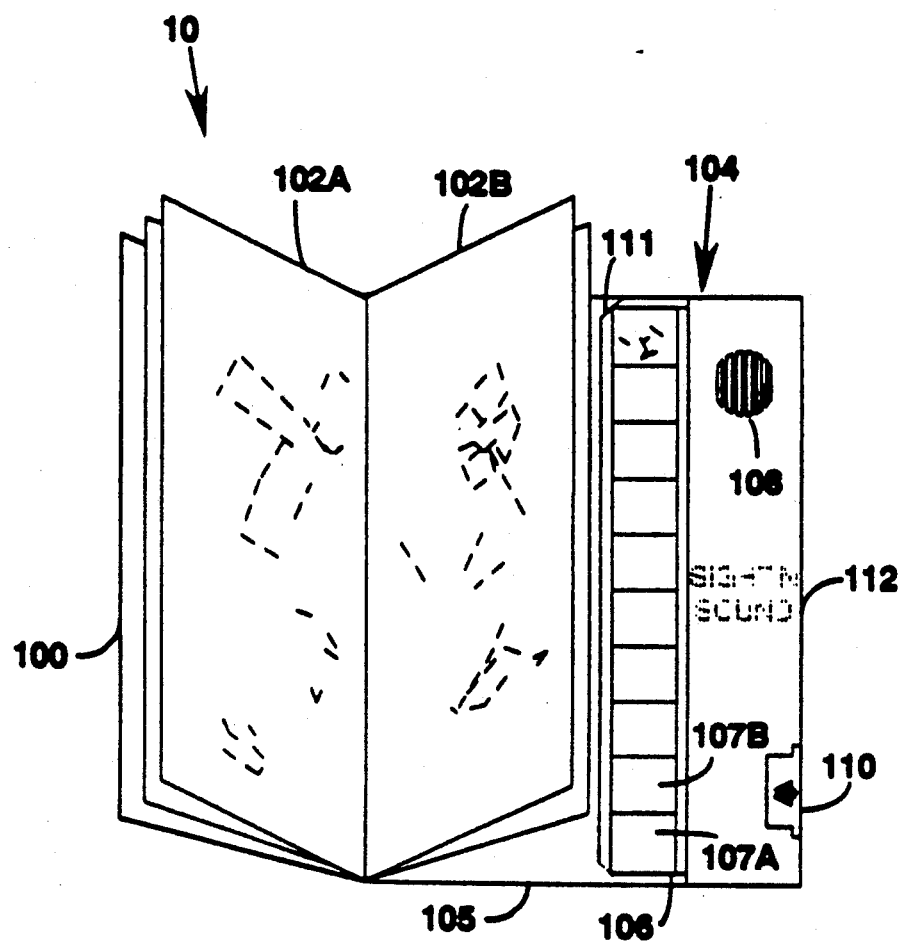
FIG. 1F is a top plan view of the preferred exemplary embodiment with pages of a graphics portion open.

Referring to FIGS. 1A-1F, an interactive audiovisual work 10, the preferred exemplary embodiment of the present invention, comprises a graphics portion 100 and an electronic unit 104, residing on a substrate 105. Graphics portion 100 suitably comprises a book including a plurality of pages 102 (102a, 102b, 102c, etc; FIG. 1F), each bearing graphics and/or text bound along a spine 100a by respective staples 60 (FIG. 1E) or by some other conventional binding mechanism. Graphics portion 100 is preferably of planar dimensions in accordance with the dimensions of substrate 105: of a length substantially coextensive with the length of substrate 105; and of a width a predetermined amount less than the width of substrate 105 (corresponding to the width of electronics unit 104).

Electronics unit 104 is likewise of dimensions in accordance with the dimensions of substrate 105; electronics unit 104 is generally rectangular in shape, of a length substantially coextensive with that of substrate 105 and of a width corresponding to the difference in width between graphics portion 100 and substrate 105. As will hereinafter be more fully described, electronics unit 104 includes a touchpad 106 including a plurality of individual touchpoints (also sometimes referred to as switchpoints) 107a, 107b, etc. Each touchpoint is demarked with a predetermined graphic. When an individual touchpoint is depressed, a sound related to the subject of the touchpoint graphic is generated by electronic unit 104.

Graphics portion 100 and electronic unit 104 are affixed to substrate 105 in predetermined disposition to facilitate coordinated use of electronic unit 104 in conjunction with graphics portion 100.

Spine 100A of graphics portion 100 and electronic unit 104 are suitably disposed along opposing edges of substrate 105, with touch pad 106 proximate to the side of graphics portion 100, opposite the spine. Thus, when pages 102A, 102B, etc., are opened, touchpad 106 remains exposed and readily accessed while reviewing the text on pages 102. To facilitate the turning of pages 102 while at the same time disposing touchpad 106 proximate to the edge of pages 102, respective interior corners 111 (best seen in FIGS. 1A and 1F) are blunted, or notched. Ready access to the corners of pages 102 is thus provided so that even a child with limited manual dexterity can readily turn pages 102.

The substantive content of the text and graphics of graphics portion 100 suitably corresponds to the text of a story with graphics interposed at appropriate places in the text. Such graphics correspond (preferably identical) to one of the respective graphics denoting one of touchpoints 107 on touchpad 106. The user is intended to depress the appropriate touchpoint 107 at the proper place in the story. For example, touchpoint 107A may be demarked with a picture of a dog, and the story may read, "The dog barked" followed by a picture of a dog. The picture of a dog on touchpoint 107A is then touched, effecting generation of a barking sound. Each touchpoint 107, when depressed, effects generation of a unique and distinct sound corresponding to the graphic demarking the touchpoint. Touchpad 106 may also be used as a sound generator independently of the story to allow for a child's imaginative use of the audio visual work.

Figure 2:
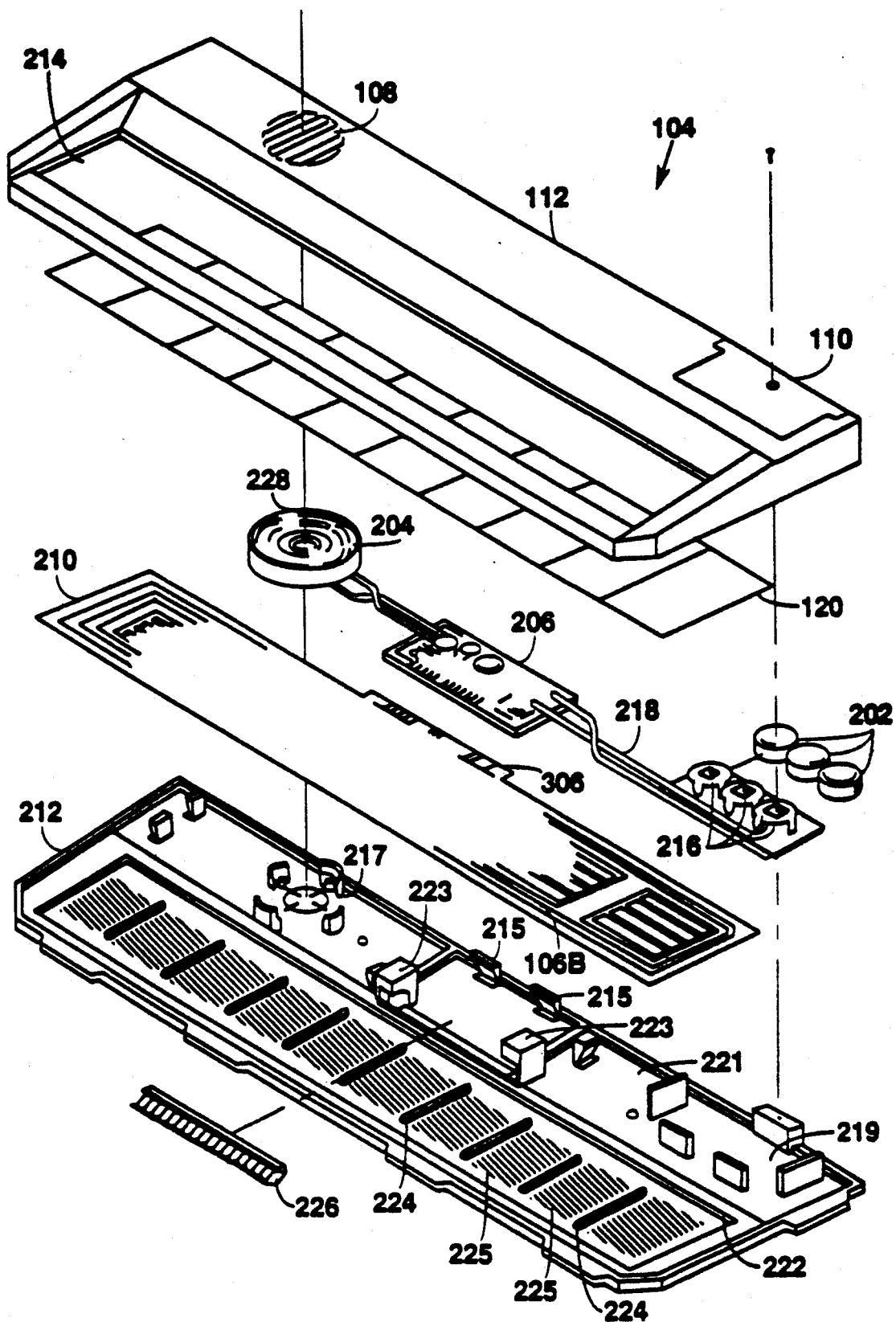
FIG. 2 is an exploded view of the electronic unit of FIG. 1.

Referring now to FIG. 1F and 2, electronic unit 104 suitably comprises: an upper casing cover 112; a circuit board 206; a thin-line, high-fidelity speaker 204; respective batteries 202 and battery receptacles 216; a flexible membrane 210; a flexible label strip 120; and a molded base 212.

Upper casing 112 and base 212 cooperate to contain the various electrical components of electronic unit 104, and to maintain label strip 120, membrane 210 and molded base 212 in predetermined relative disposition to define a matrix of the respective component switch points 107A, B, etc. of touchpad 106.

Casing 112 suitably includes a touchpad aperture 214, a louvered speaker aperture 108, and a removable battery cover 110. Touchpad aperture 214 is suitably elongated and rectangular in shape extending along the longitudinal side of casing 112 adjacent graphics portion 100. If desired, however, touchpad aperture 214 may comprise a plurality of smaller apertures of the same or varying shape disposed to overlie respective switch points 107 on touchpad 106. Speaker aperture 108 is configured to cooperate as part of a resonant chamber to baffle and front load speaker 204 to facilitate production of higher fidelity sounds than would otherwise be possible with a relatively small speaker. Aperture 108 will hereinafter be more fully described in conjunction with FIG. 5.

Base 212 includes suitable supports 215, 217 and 219 for circuit board 206, speaker 204, and battery receptacles 216, respectively, and a plurality of forward holding tabs 223. Base 212 further suitably includes a touchpad ground plane 222, comprising a slightly recessed portion, in which respective conductive patches 225, suitably formed of conductive paint, are deposited, separated by a plurality of projecting spacer bars 224. As shown in FIG. 2, spacer bars 224 are suitably formed in base 212, e.g., by molding.

Figure 3:
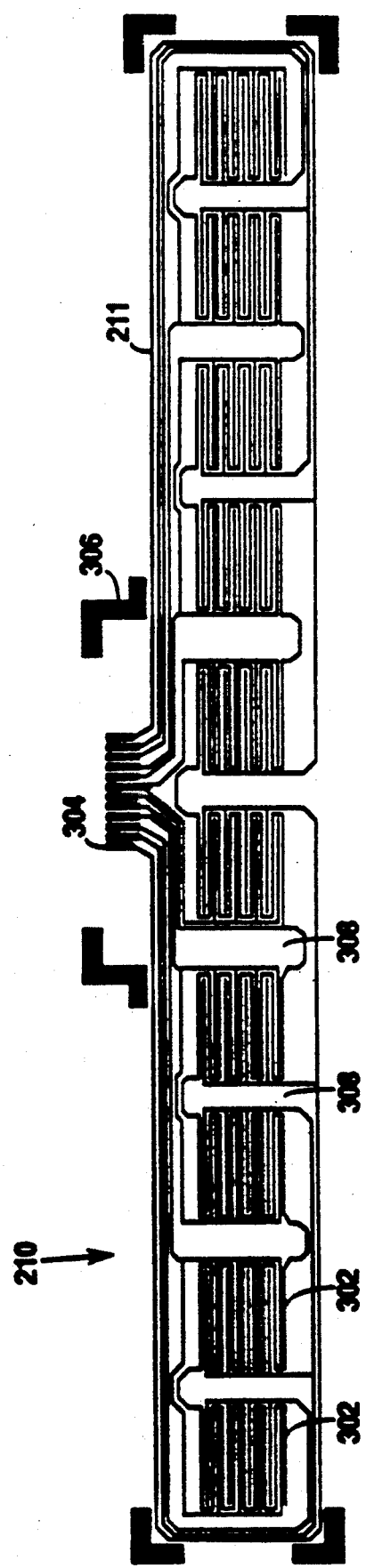
FIG. 3 is a plan view of the underside of the membrane of FIG. 2.

Referring briefly to both FIGS. 2 and 3, label strip 210, membrane 210, and ground plane 222 of base 212 cooperate to form touchpad 106. Label strip 120 is suitably a strip of paper upon which the graphics, e.g. pictures or icons, are printed at predetermined positions corresponding to the spacing of conductive patches 225 of ground plane 222. If desired, label strip 120 can be coated or overlaid with a protective plastic film (not separately shown). Membrane 210, suitably comprising a polyester or mylar film, bears a triple interleaved (interdigitated) conductor matrix 211 on the underside thereof. As best seen in FIG. 3, matrix 211 comprises a plurality of conductors configured to provide a respective interdigitated grouping 302 of three conductors corresponding to each touchpoint, spaced apart from the conductor groupings by respective nonconductive areas 308 disposed in accordance with the relative spacing of conductive patches 225 in ground plane 222. Each conductor grouping 302 suitably comprises a unique set of three conductors, as will be more fully described in conjunction with FIG. 4.

In assembly, label strip 120 is maintained in alignment with touchpad aperture 214, with the respective touchpoint graphics exposed through aperture 214. Label strip 120 overlies flexible membrane 210, which in turn overlies ground plane 222. Flexible membrane 210 rests upon spacer bars 224, with spacer bars 224 aligned with respective nonconductive areas 308 separating the respective touchpoint conductor groupings, and setting off the conductor groupings 302 from underlying conductive patches 225 by a predetermined distance. When a touchpoint graphic is touched (depressed), flexible membrane 210 is concomitantly depressed, bringing the particular underlying conductor grouping 302 into contact with the associated conductive patch 225, effecting an electrical connection between the respective interdigitated conductors of the grouping. The presence of spacer bar 224 between the affected touchpoint and the adjacent touchpoints prevents the depression of one touchpoint from causing the adjacent grouping of conductors to come into contact with its associated conductive patch 225. Further, there is sufficient spacing between each of touchpoints 107 to minimize the likelihood of a finger depressing more than one touchpoint at a time.

Membrane 210 is physically secured and electrically connected to the printed circuit board 206 by a clip 226 (FIG. 2), suitably formed of polished spring steel. The support structure for circuit board 206 suitably comprises a recess 221 disposed between respective notched rear circuit board supports 215 and forward holding tabs 223. Circuit board 206 rests on base 212 in recess 221 with the rear of circuit board 206 received in the notches of rear supports 215. The front of circuit board 206 is disposed between holding tabs 223, lying, in assembly, under an edge portion 306 of membrane 210 such that connectors 304 on membrane 210 are disposed directly over a plurality of connecting strips 227 on the front of circuit board 206. Clip 226 lies under holding tabs 223, and exerts downward pressure on membrane 210 to ensure that connectors 304 on the lower side of membrane 210 are in electrical contact with connecting strips 227 on the upper surface of circuit board 206.

As will hereinafter be more fully explained in conjunction with FIG. 4, circuit board 206 suitably comprises and interconnects a conventional sound generator chip, e.g., sound digitizer, and cooperating components. Briefly, electronic unit 104 selectively generates one of a plurality of sounds in accordance with actuation of touchpad 106. If during generation of a first sound a touchpoint 107 is touched, the first sound is immediately ended and the sound corresponding to the subsequently depressed touchpoint immediately started. When no touchpoint 107 is depressed, electronic unit 104 consumes little power. Further, even when a touchpoint 107 is continuously depressed, a sound is generated only once, and little power consumed after completion of the sound generation.

As previously mentioned, aperture 108 forms part of a resonant chamber which baffles and front loads speaker 204 to increase fidelity. Speaker 204 is suitably a 32 ohm thin line speaker, such as a CEL-2732 speaker, available from Zeitek, of Taiwan. Alternatively, a 64 ohm speaker may be used. A rim 228, best seen in FIG. 2, is provided about the periphery of speaker 204, extending a predetermined distance above the active surface of the speaker. In assembly, rim 228 abuts the underside of casing 112 with speaker 204 underlying aperture 108. If desired, aperture 108 can be formed as an insert snap fit, or otherwise affixed, in a corresponding aperture in casing 112.

Figure 5A:
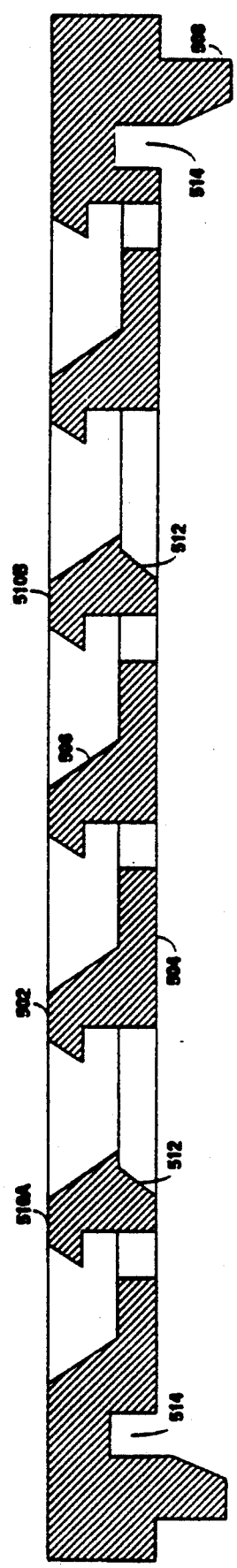
FIG. 5A is an elevational cross-section of the preferred exemplary embodiment of the louvered speaker aperture.

Referring now to FIG. 5A, louvered speaker aperture 108 is comprised of louvers 510 (510A, 510B, etc.). Louvers 510 are comprised of a substantially trapezoidal upper portion 502, a substantially rectangular lower portion 504 and a substantially trapezoidal vertical connecting portion 506. Vertical portions 506 connect upper portions 502 and lower portions 504, disposing upper portion 502, vertically spaced and offset horizontally from lower portion 504 by predetermined distances. The relative disposition of adjacent louvers 510 is such that a vertical space is maintained between upper portion 502 on one louver and the lower portion 504 on the adjacent louver. A plurality of recessed portions 514, are provided to receive speaker rim 228 (FIG. 2). Similarly, a plurality of cut away portions 512 on louvers 510A and 510B, respectively, are provided to prevent the cone of speaker 508 from coming into contact with louvers 510.

In the preferred exemplary embodiment the length of the upper portion 502 is approximately 1.5 millimeters long on the upper edge, approximately 2.0 millimeters long on the lower edge, and approximately 0.5 millimeters in height. The distance between upper portions 502 on adjacent louvers is approximately 2.5 millimeters. The lower portions 504 are approximately 2.75 millimeters by 0.75 millimeters with a spacing of approximately 1.25 millimeters between lower portions on adjacent louvers. The vertical separation between an upper portion 502 on one louver and a lower portion 504 on adjacent louver is approximately 0.75 millimeters. This design results in protection of the speaker from a small child attempting to insert something into the speaker, and provides for front loading of the speaker to increase sound quality.

Figure 5B:
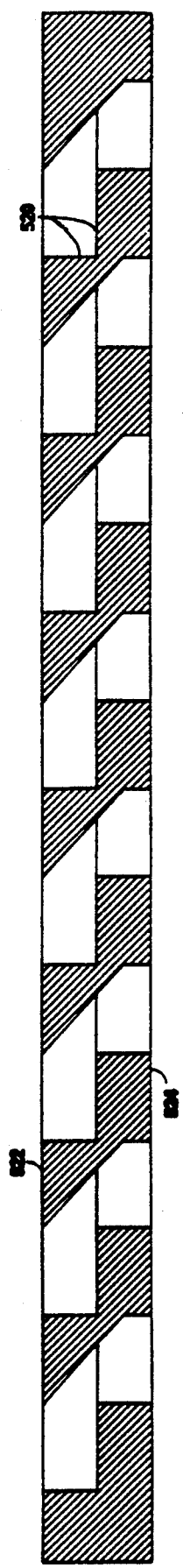
FIG. 5B is an elevational cross-section of an alternative embodiment of the louvered speaker aperture.

Referring now to FIG. 5B, in an alternative embodiment, louvered speaker aperture 108 is comprised of an upper portion 522 and a lower portion 524. Upper portion 520 is substantially trapezoidal and is offset horizontally from rectangular lower portion 524. The trapezoidal shape of upper portion 522 provides a vertical space between upper portion 522 on one louver and lower portion 524 on the adjacent louver. This design also results in protection of the speaker from a small child attempting to insert something into the speaker, and provides for front loading of the speaker to increase sound quality.

Figure 4:
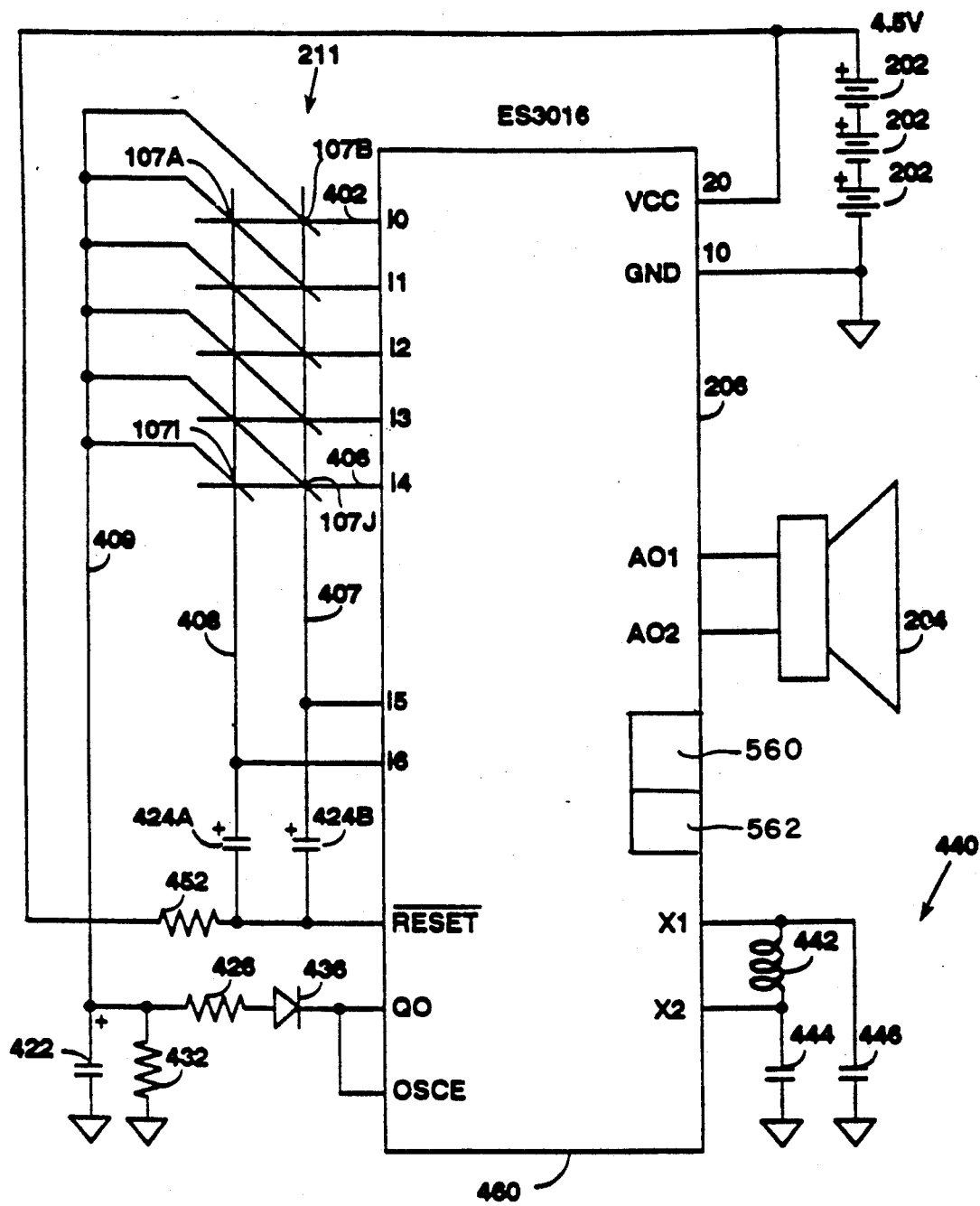
FIG. 4 is a schematic diagram of the electronic sound generator and associated circuitry.

Referring to FIG. 4, digital sound generator 460, hereinafter DSG 460, resides on circuit board 206. DSG 460 can be any suitable digital sound generator, which generates selected sound indicia in response to address signals supplied thereto, and includes a reset input terminal that effects a relatively fast reset of the chip when actuated. If desired, a sound synthesizer can be utilized. However, a much less complex, and less expensive, digital sound generator chip such as an ES 3016 Sound Magician, available from Electronic Speech Systems, Inc. is preferred. Digital representations of a predetermined number (e.g., 10) of selected sounds are stored within the chip, and selectively accessed to provide a corresponding analog sound output, in response to input signals (generated in response to instructions of touch pad 106).

DSG 460 suitably includes, integral to the chip, a programmed logic array (PLA), a suitable sound control unit (e.g., microprocessor), a read-only memory (ROM), an output port servicing respective digital outputs Q0-Q4 (only Q0 shown), and a digital to analog (D/A) converter. Digital indicia of the respective sounds, suitably compressed in accordance with a predetermined algorithm as known in the art, are stored in the integral ROM together with various command information, (e.g., the compression/expansion algorithm and operating program for the sound control unit). The PLA, programmed in accordance with conventional techniques, performs logical operations on respective address (sound select) signals provided at respective input terminals (I0-I6) to determine a particular sound to be generated, and the state of the digital outputs. In response to the address (sound select) signals, the PLA generates an address to the sound control unit, which responsively accesses the digital representation of the selected sound in the ROM, and generates an expanded (decompressed) digital representation of the sound. The decompressed sound indicia is applied through the D/A converter to generate an analog sound output, provided at respective output terminals A01 and A02 for application to speaker 204. When the sound generation is completed, the sound control unit generates an appropriate signal to the PLA, which in turn causes a logic low signal to be provided at logic output Q0.

Depending upon the programming of the PLA, the DSG 460 optionally includes means 560 for controlling the generating of a selected sound so that the selected sound is generated a predetermined number of times for each time one of the actuable switches is activated, and means 562 for precluding generation of more than one iteration of the selected sound in response to a given actuation of one of the actuable switches (that is, for precluding more than one iteration of the sound associated with a given actuation of a given individual actuable element).

DSG 460 also suitably includes an integral clock generator for providing a clock signal to various components of the chip. An inexpensive oscillator 440 (e.g., inductor 442, capacitors 444, 446) is coupled to the clock generator at respective inputs X1 and X2. However, power is provided to oscillator 440 only during such times as a high logic level signal is provided at an oscillator enable input terminal (OSCE).

Sound generation is, however, interrupted by application of a logic low level signal to a reset input (RESET).

Each of conductor groupings 302 of matrix 221, corresponds to a unique combination of conductors connected inputs I0-I6 of DSG 460. Matrix 211 is represented diagrammatically in FIG. 4 as a plurality of conductors, e.g., 402-409. The respective junctures of conductor combinations 402-409 represent the respective interdigitated conductor groupings 302 and touchpoints 107). Conductor 409 is electrically connected to ground through a capacitor 422 suitably 47 microfarads, and conductors 407 and 408 are electrically connected to inputs I5 and I6 of DSG 460 and, through capacitors 424A and 424B, respectively, to the reset input of DSG 460. Conductors 402–406 are each connected to a respective input (I0–I4) of DSG 460.

As disclosed earlier, when a particular touchpoint 107 is depressed the three conductors comprising the corresponding conductor grouping 302 are electrically connected by the associated conductive patch 225. Thus, when a touchpoint 107 is depressed:

the correspondening inputs, (i.e. one of inputs I5 and I6, and one of inputs I0–I4), are temporarily grounded through conductor 409 and capacitor 422 (capacitor 422 is initially discharged, as will be explained); and the reset terminal of DSG 460, is temporarily coupled to ground through one of capacitors 424, conductors 407 or 408, conductor 409 and capacitor 422. Grounding (selecting) one of inputs I0 through I4 and one of inputs I5 and I6 causes the PLA on DSG 460 to selectively generate control signals to effect generation of a selected one of the respective sounds represented in the ROM.

As previously noted, depression of a touchpoint 107 while a sound generation operation is in process, will interrupt the in-process sound generation and initiate a sound generation operation corresponding to the subsequently depressed touchpoint. This "interrupt" feature is effected by temporarily resetting DSG 460 in response to depression of any touchpoint, then releasing (enabling) DSG 460 within a sufficiently short period that the touchpoint would typically still be depressed, so that DSG 460 then reacts to the address input signals generated by the touchpoint depression. More specifically, capacitors 424 are initially discharged. When a touchpoint 107 is depressed, a current path is completed from battery 202 to ground, through a limiting resistor 452 (suitably 100,000 ohms), one of capacitors 424, one of conductors 407 and 408, conductor 409 and capacitor 422. The reset terminal of DSG 460, connected to the juncture of resistor 452 and capacitors 424, is thus initially placed at ground potential, resetting DSG 460 and causing DSG 460 to immediately cease sound production. However, capacitors 424A and 424B are charged by power source 202 through resistor 452, quickly (e.g., within several milliseconds) reaching a potential corresponding to logic high, effectively re-enabling DSG 460. This allows DSG 460 to again produce sound, provided that one of touchpoints 107 is still depressed when the logic high potential is reached. This would typically be the case. The time constants of capacitors 424 are chosen to assure that the capacitors reach logic high potential prior to the release of touch point 107 in typical usage.

As also previously noted, provisions are made to extend the life, and prevent inadvertant exhaustion, of battery 202; little power is consumed when none of touchpoints 107 is depressed, and a sound is generated only once in response to a depression of a touchpoint 107. When DSG 460 has completed generating a selected sound, a logic low level signal is generated at output terminal 20. Output Q0 is connected to oscillator enable input OSCE, disabling the oscillator 440. When oscillator 440 is disabled, DSG 460 requires only several microamps. Thus, power consumption is reduced when sound generation is not in process. Grounding Reset terminal (RESET) causes the output of Q0 to go HIGH, which in turn drives OSCE HIGH, enabling the oscillator, and allowing sound to be produced. A resistor 426, suitably 1000 ohms and a diode 436, are provided to limit the current into Q0 and prevent Q0 (and OSCE) from being pulled to ground (when Q0 and OSCE are HIGH) by the positive side of capacitor 422, (which may be at ground potential).

Furthermore, inputs I0 through I6 of DSG 460 are each provided with a current source, which, when connected to capacitor 422 by depression of touchpoint 107, charge capacitor 422 at a rate determined by the time constant of capacitor 422 and a resistor 432 (suitably 4.7 M ohms). When capacitor 422 is charged, inputs I0 through I6 are effectively held at a logic high potential. Thus, all touchpoints 107 are effectively inhibited until the depressed touchpoint is released, breaking the current path between battery 202 and capacitor 422, and permitting capacitor 422 to discharge.

Thus, it should be apparent that the present invention provides an interactive audiovisual work that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

We claim:

1. An interactive audio-visual work comprising:
   a substrate;
   printed matter disposed on said substrate;
   input means comprising a plurality of selectively actuable switches disposed on said substrate in predetermined disposition relative to said printed matter for selectively generating input signals to a sound generator means, each of said switches comprising a grouping of first, second and third conductors in predetermined relative disposition and a contactor for selectively effecting an electrical connection between said first, second and third conductors; and
   circuit means disposed on said substrate, said circuit means comprising:
   the sound generator means, responsive to input signals applied thereto, for selectively generating a selected one of a plurality sound, and
   interrupting and generating means for interrupting generation of an initially selected sound by said sound generator means in response to an initially actuated switch prior to completion and initiating generation of a subsequently selected sound by said sound generator means in response to a subsequently actuated switch.

2. The work of claim 1 wherein said input means further comprises a movable member with each of said grouping of said first, second and third conductors disposed in predetermined relative disposition thereon, and wherein said contactor is fixedly disposed on said substrate for selectively effecting an electrical connection between said first, second and third conductors, each of said switches being independently closed by movement of said movable member and hence said one grouping of said first, second and third conductors towards said fixedly disposed contactor.

3. The work of claim 1 wherein
   said sound generator means includes means for controlling said generating of said selected sound so that said selected sound is generated a predetermined number of times for each time one of said switches is activated.

4. The work of claim 3 wherein for particular ones of said switches said predetermined number of times is greater than one.

5. The work of claim 1 wherein said sound generator means further comprises a thin line speaker having a nominal impedance of at least 32 ohms residing in a baffled speaker chamber having a louvered aperture to provide front loading.

6. The work of claim 5 wherein said louvred aperture comprises a plurality of elongated louvres, each of said louvres comprising:
an upper portion having a substantially trapezoidal cross section, a lower portion having a substantially rectangular cross section, a vertical portion having a substantially trapezoidal cross section, and said vertical portion connecting said upper and lower portion;
said upper portion being offset horizontally from said lower portion by a predetermined distance; and
said louvres disposed such that a vertical space is maintained between said upper portion of a first louvre and said lower portion of a second lourve, said second louvre being adjacent said first louvre.

7. The work of claim 5 wherein
said lourved aperture comprises a plurality of elongated louvres;
each of said louvres comprising an upper portion having a substantially trapezoidal cross section and a lower portion having a substantially rectangular cross section;
said upper portion being horizontally offset from said lower portion; and
said louvres disposed such that a vertical space is maintained between said upper portion of a first louvre and said lower portion of a second lourve, said second lourve being adjacent said first louvre.

8. The work of claim 1 wherein said input means comprises a rigid housing base; wherein said contactor comprising a plurality of conductive patches disposed on said base; a flexible membrane; wherein said groupings of said first, second and third conductors are formed on said flexible membrane; said membrane being disposed such that said plurality of conductive patches respectively underlie each of said groupings of said first, second and third conductors; and means, disposed separating said plurality of conductive patches, for spacing said groupings of said first, second and third conductors apart from said plurality of conductive patches, such that depression of said membrane over an individual grouping of said first, second and third conductors causes said grouping of said first, second and third conductors to contact the respective underlying conductive patch, without effecting contact between any other of the groupings of said first, second and third conductors and their respective underlying conductive patches.

9. The work of claim 8 wherein said means for spacing comprises respective spacer bars disposed between said plurality of conductive patches.

10. The work of claim 9 wherein said respective spacer bars project from said base.

11. The work of claim 8 wherein said plurality of switches is characterized by the absence of a printed circuit board.

12. The work of claim 8 wherein said base is stationary.

13. An interactive audio-visual work comprising:
a substrate;
printed material comprising a plurality of pages disposed on said substrate;
a plurality of selectively actuable individual switches arranged in predetermined relative disposition with said printed material; and
circuit means including sound generator means for generating a respective predetermined sound in response to actuation of said individual switches, and interrupting and generating means for interrupting generation of predetermined sound associated with an initially actuated switch and generating the predetermined sound associated with a subsequently actuated switch in response to actuation of said subsequently actuated switch.

14. The work of claim 13 wherein
said selectively actuable switches individual are housed under a substantially rectangular shaped casing; and
a first side of said casing adjacent to said printed material is provided with notches such that said pages are easily turned.

15. The work of claim 13 wherein said interrupting and generating means includes a capacitor.

16. The work of claim 15 wherein said capacitor is discharged to interrupt generation of the predetermined sound associated with said initially actuated switch and said capacitor is charged to generate the predetermined sound associated with said subsequently actuated sound.

17. A sound generating interactive audio-visual work including printed material disposed on a substrate, sound generator means disposed on said substrate for selectively generating sounds in response to selection signals applied thereto, and selection input means including a plurality of individually actuable elements disposed on said substrate in predetermined disposition relative to said printed material, each of said elements associated with a respective sound, for selectively generating a selection signal corresponding to the sound associated with an actuated element, the improvement comprising:
said sound generator means including means for interrupting and inhibiting the generating of said sounds in response to a reset signal applied thereto, and means for precluding generation of more than one iteration of said associated sound in response to one actuation of an actuated element; and
said selection input means including means for momentarily generating said reset signal upon actuation of any of said individually actuable elements, such that actuation of an element will effect the generating of the sound associated therewith without human perceptible delay, even if actuated during the generating of a sound in response to a previous actuation of an element.

18. The work of claim 17, wherein said selection input means comprises a touchpad and said elements comprise individual touchpoints of said touchpad.

19. The work of claim 17 wherein said sound generator means further includes respective selection input terminals and a reset input terminal, said sound generator means selectively generating sounds in accordance with the rendering active of respective sequential actuated selection input terminals, and said reset signal rendering said reset terminal active to actuate said means for interrupting and inhibiting the generating of said sounds.

20. The work of claim 17 wherein said selection input means further includes a resilient membrane; and wherein each of said elements includes a conductive addressing circuit disposed on said resilient membrane, a conductive shorting contact and means for separating said conductive shorting contact and said conductive addressing circuit.

21. The printed matter of claim 17 wherein said work is in the form of a book comprising a plurality of pages bound together at a spine, at least some of the pages bearing graphic material.

22. An interactive audio-visual work comprising:
a book comprising a plurality of pages bound together at a spine, at least some of said pages bearing graphic material including respective predetermined depictions;
a sound generator unit comprising:
a touchpad comprising a plurality of individually actuable points, each of said individually actuable points being marked with a respective one of said depictions;
circuit means including an electronic sound generator cooperating with said touchpad to generate, in response to actuation of each of said individually actuable points, a respective individual sound associated with the depiction marked on said individually actuable point, and interrupting and generating means for interrupting generation of an initially selected sound by said electronic sound generator in response to an initially actuated point and initiating generation of a subsequently selected sound by said electronic sound generator in response to a subsequently actuated point; and
a casing, having an edge corresponding to an edge of said book, for receiving said touchpad and said electronic sound generator and accessibly disposing said touchpad proximate to said casing edge; and
means for disposing said casing with said casing edge adjacent to but not overlapping said book edge such that the depictions marked on said individually actuable points are readily viewed together with the graphic material on said pages and accessible when said pages are opened.

23. An interactive audio-visual work comprising:
a plurality of pages;
a text portion of said plurality of pages, said text portion including on each of at least two of said plurality of pages both a plurality of lines of text and a plurality of different predetermined graphic depictions related in concept to the subject matter of the text interposed within said lines of text;
a switching mechanism, disposed in predetermined relationship to said text portion, and including a plurality of individually actuable elements, each of said elements being associated with one of said graphic depictions, said graphic depictions in said text portion and said graphic depictions on said elements being correlated only by the subject matter thereof; and circuit means including digital sound generator means responsive to actuation of any one of said elements, for selectively effecting generation of a sound associated with said graphic depiction marked on said element, and interrupting and generating means for interrupting generation of an initially selected sound by said sound generator means in response to an initially actuated element and initiating generation of a subsequently selected sound by said sound generator means in response to a subsequently actuated element.

24. The book of claim 23 wherein said switching mechanism comprises:
a rigid housing base;
respective spacers projecting from said base;
conductive patches disposed on said base with said spacers interposed therebetween;
a flexible membrane; and
respective spaced apart groups of conductors, formed on said flexible membrane, each of said groupings of conductors being associated with one of said graphic depictions; and said membrane being disposed such that said each of said groupings of conductors overlies at a respective one of said conductive patches, spaced apart from other conductive patches by said spacers.

25. The book of claim 24 wherein said switching mechanism is characterized by the absence of a printed circuit board.

26. An interactive audio-visual work comprising:
a substrate;
printed matter disposed on said substrate;
input means comprising a plurality of selectively actuable switches disposed on said substrate in predetermined disposition relative to said printed matter for selectively generating input signals to a sound generator means, each of said switches comprising a plurality of conductors in predetermined relatively disposition and a contactor for selectively effecting an electrical connection between said plurality conductors; and
circuit means disposed on said substrate, said circuit means comprising:
the sound generator means, responsive to said input signals applied thereto, for selectively generating a selected one of a plurality sounds,
interrupting and generating means for interrupting generation of an initially selected sound by said sound generator means in response to an initially actuated switch and initiating generation of a subsequently selected sound by said sound generator means in response to a subsequently actuated switch, and
means for precluding generation of more than one iteration of said selected sound in response to one actuation of an actuated switch.

27. The work of claim 26 wherein said input means further comprises a movable member with said plurality of conductors in predetermined relative disposition thereon said switch being closed by movement of said movable member and hence said conductors towards said contactor.

* * * * *